June 2, 1925.

R. C. MATHES 1,540,355

VACUUM TUBE TESTING DEVICE

Filed Oct. 20, 1919

2 Sheets-Sheet 1

Inventor:
Robert C. Mathes by    Atty.

June 2, 1925.  R. C. MATHES  1,540,355
VACUUM TUBE TESTING DEVICE
Filed Oct. 20, 1919   2 Sheets-Sheet 2

Inventor:
Robert C. Mathes
by  *J. E. Roberts*  Att'y.

Patented June 2, 1925.

1,540,355

UNITED STATES PATENT OFFICE.

ROBERT C. MATHES, OF NEW YORK, N. Y., ASSIGNOR TO WESTERN ELECTRIC COMPANY, INCORPORATED, OF NEW YORK, N. Y., A CORPORATION OF NEW YORK.

VACUUM-TUBE-TESTING DEVICE.

Application filed October 20, 1919. Serial No. 332,005.

*To all whom it may concern:*

Be it known that I, ROBERT C. MATHES, a citizen of the United States, residing at New York, in the county of Bronx, State of New York, have invented certain new and useful Improvements in Vacuum-Tube-Testing Devices, of which the following is a full, clear, concise, and exact description.

This invention relates to apparatus for subjecting certain devices to vibration, and particularly to subjecting vacuum tubes to such a test to discover loose parts in the assembly.

Its object is to provide a simple and compact apparatus which will subject a device to a series of irregular vibrations and to provide an electrical circuit connected with the device so that any irregularities or defects in the assembly may be detected.

This invention in general comprises a plate upon which the device is mounted, and means for subjecting this plate to a series of irregular vibrations in several directions. Preferably, this means comprises a series of electromagnets which are operated by a motor driven sequence switch. If the device is one in which an electric current can be established, a normal current of a constant value is passed therethrough and may be carried through a telephone head receiver set either at its normal value or in amplified form by means of a vacuum tube amplifier set. By this means, a variation of normal current passed through the device to be tested, which variation may be caused by loose connections or parts, will be noted in the head receiver set in the form of a pulsating tone. In the case of a vacuum tube, this variable current is caused by the impedance variations produced by the alteration of the space relation of the electrodes when loose and by variable resistance in loose contacts. Means may also be provided whereby a visual indication of a change or pulsation of this normal current is given. This visual means may be a current indicating instrument placed in the above-mentioned circuit at any suitable point.

Figure 1:
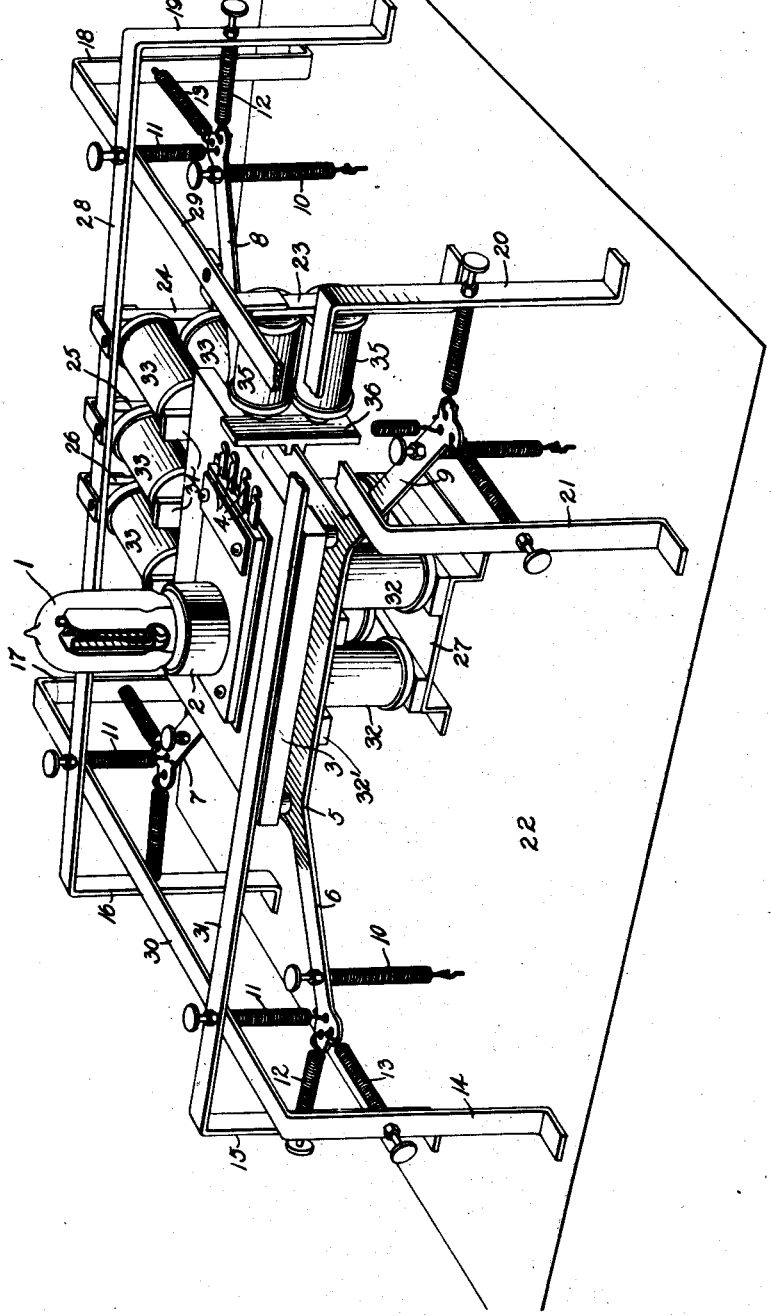
Figure 2:
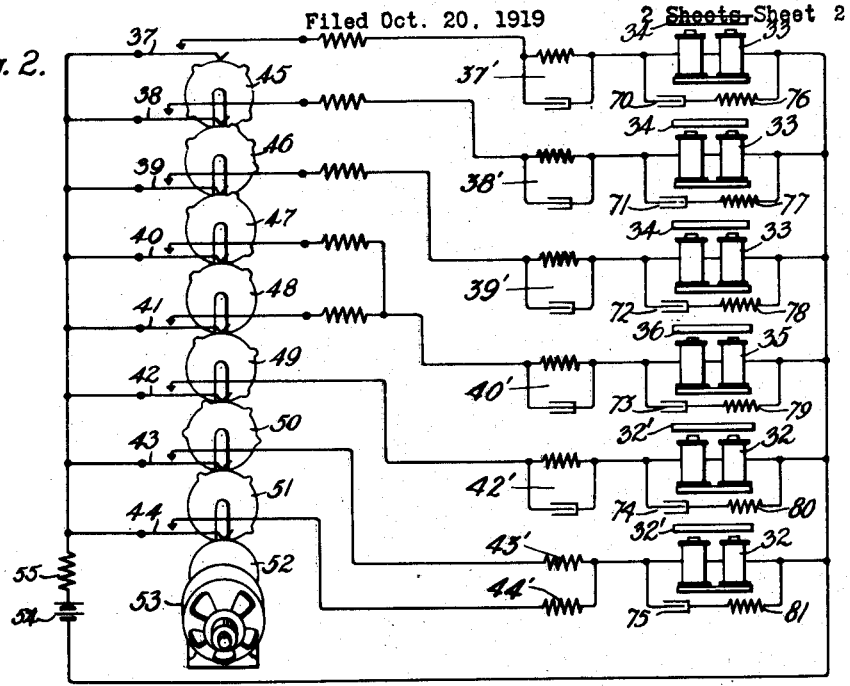
Figure 3:
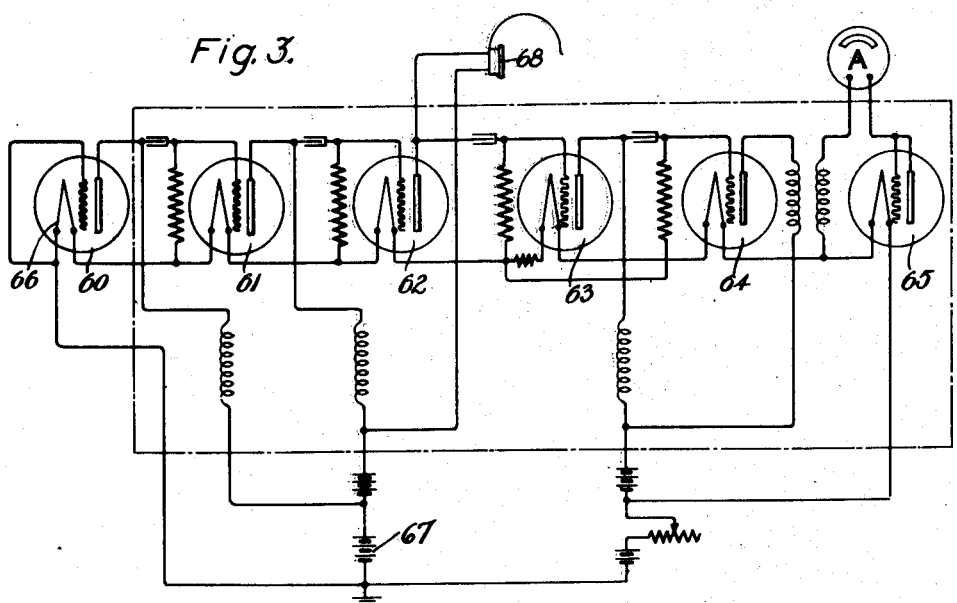

The invention is illustrated in the drawings of which Fig. 1 is a perspective view of the test table and a preferred means for vibrating the same; Fig. 2 shows the vibration magnets, the motor-driven sequence switch for irregularly energizing the same and the connections therebetween; Fig. 3 shows the circuit connections between the device to be tested and the head receiver indicator, and the visual indicator.

As shown in Fig. 1, the device to be tested which may be a vacuum tube 1, is mounted in a suitable socket 2 on a plate 3. This socket has terminal connections 4, whereby connections may be made to the indication circuit. The plate 3 is connected to a plate 5 which has arms 6, 7, 8 and 9, extending outwardly and diagonally from the four corners thereof. Each of these arms is connected to and resiliently supported by a set of springs 10, 11, 12 and 13. Each of the springs 12 and 13 is adjustably connected to one of the vertical uprights 14, 15, 16, 17, 18, 19, 20 and 21. Each of the springs 11 is adjustably connected to one of the horizontal bars 28 and 29 at the points where these bars are intersected by the supporting bars 30 and 31, each of these bars being supported by and preferably integral with one of the vertical uprights. Each of the springs 10 is connected to a base plate 22 upon which the vertical uprights are mounted, each of these springs being adjustably connected to one of the arms 6, 7, 8 and 9. This arrangement for supporting the plate allows it universal movement or in other words, movement in three directions at right angles to each other. Uprights 23, 24, 25 and 26 are mounted on the base plate 22 and serve to support the vibration magnets 35 and 33 respectively. A plate 27 mounted on the base plate 22 serves to support the vibration magnets 32. The magnets 32 are adapted to be energized and actuate armatures 32′ fastened to the lower face of plate 5. The magnets 33 are mounted at one side of the plate 5, in pairs and serve to actuate armatures 34 in a manner to be later described. Magnets 35 are mounted at another side of the plate 5 which when energized actuate an armature 36. The armatures above-mentioned are connected to the plate 5 in any suitable manner so that by their actuation the plate 5 is vibrated in a plurality of plane dimensions, ensuring more rapid and certain location of defects in the device under test.

In order to provide a series of irregular vibrations to the plate 5, these magnets, as shown in Fig. 2 are connected by suitable circuit connections to switches 37, 38, 39, 40, 41, 42, 43 and 44 which are actuated in a predetermined manner by means of cams 45 to 52, inclusive. These cams are in turn operated by a motor 53 connected to any suitable source of power. A battery 54 and a resistance 55 are connected in circuit with the switches and magnets, to provide the desired amount of current therethrough.

In circuit with the switching means and their respective magnets are a plurality of networks 37', 38', 39', 40', 42', 43' and 44', each comprising a resistance or a resistance and a capacity. The value of the resistances and capacities in each branch may be varied. The purpose of these networks is to cause the strength and character of the impulse given to a magnet to vary from that given to another magnet. In this manner the irregularity of the series of vibrations given to the series of magnets is further accentuated. This irregularity is important since a single frequency vibration may utterly fail to locate serious defects. In addition, the magnets may be shunted by capacity elements 70—75 and by resistance elements 76—81. The capacities absorb the energy of the magnets when the commutator switches are opened and the resistances absorb the energy of the capacities when the switches are closed. This prevents sparking when the circuit is opened and prevents fusing the switch contacts when the circuit is closed.

In Fig. 3, 60 represents the tube to be tested. This is connected in any well-known manner to a series of tubes 61 to 65, so that variations in the predetermined space current established by the battery 67 may be amplified through this series of tubes to any desired value. At some suitable point in this circuit the head receiver set 68 is inserted and in this receiver set is indicated in amplified form any pulsations or changes in the space current set up in tube 60 which may be caused by any defective connections or loose parts of the device to be tested. An ammeter A is placed across the tube 65 and similarly indicates in amplified form the mean value of the amplified and rectified pulsations originating in the space current through tube 60. If the space current through tube 60 is normal, the ammeter needle will not deflect, but if the space current is variable through the tube due to imperfect connections, the ammeter will indicate the degree of these variations. Similarly, variations in the filament current of the tube under test may be observed.

In the operation of this device, the device to be tested is placed upon the testing table and the vibrating mechanism is started. This mechanism, although shown in the form of electromagnets, actuated by motor-driven sequence switches, may well be some other form of mechanism not shown, such as mechanically operated cams connected or placed adjacent the plate 5 to give a similar irregular series of vibrations thereto. The tone in the head receiver set is noted and if it has a steady value this indicates that the tube has no mechanical defects. However, if the tone is pulsating or variable, this is an indication that the space current through the tube to be tested, which current should be steady, is not steady, due to imperfect connections or loose parts. Similarly, the indication in the ammeter will show how far from normal the current is varying. Tubes that show a variation within a certain minimum limit, are presumed to be in good condition, and those which diverge beyond this minimum limit are rejected.

What is claimed is:

1. A vibration device comprising a plate, means for resiliently supporting said plate, and electro-magnetic means acting on said plate in a plurality of planes to subject said plate to vibration.

2. A vibration device comprising a plate, means for resiliently supporting said plate, a plurality of magnets in non-parallel planes adapted to actuate said plate, a source of current, and a plurality of switching means between said source and said magnets adapted to actuate said magnets in an irregular manner.

3. A vibration device comprising a plate, means for supporting said plate, a plurality of magnets in different planes adapted to actuate said plate, a source of current, a plurality of switching means between said source and said magnets adapted to actuate said magnets in an irregular manner, and means also in circuit with said magnets to vary the strength and character of the current to each magnet.

4. A vibration device comprising a plate, a plurality of magnets associated with said plate in a plurality of planes and adapted to actuate the same, a source of current in circuit with said magnets, a plurality of switching means between said source and said magnets and adapted to make and break the circuit to said magnets in an irregular manner, and a plurality of networks between said switching means and said magnets, said networks comprising resistance and capacity in variable amounts whereby the strength and character of the current to each magnet is made more irregular.

5. A vibration device comprising a support, a vacuum tube mounted on said support, means for irregularly actuating said support in a plurality of planes, circuit means connected to said tube, means for establishing a known current in said circuit, and means in said circuit to detect variations in said current caused by imperfections in the tube.

6. A vibration device comprising a support, a vacuum tube mounted on said support, means for irregularly vibrating said support in a plurality of planes, an amplifier circuit associated with said tube, means for establishing a known current in said circuit, and means in said circuit to detect variations in said current due to imperfections in the tube under vibration.

7. A vibration device comprising a support, a vacuum tube mounted on said support, means comprising a plurality of magnets adapted to actuate said support irregularly in a plurality of planes, an electrical circuit associated with said tube, a source of current to establish a known current in said circuit, and means in said circuit to detect variations in current therein due to imperfections in the tube under vibration.

8. An electrical circuit comprising means for supplying current, a plurality of magnets connected to said means, a plurality of switching means between said supplying means and said magnets and impedance elements between said switching means and said magnets to cause a variation in the strength and character of current traversing said magnets.

9. A vibration device comprising a support, a plurality of magnets for actuating said support, a source of energy for said magnets, and impedance elements between said source and said magnets to vary the amount of energy traversing said magnets.

In witness whereof, I hereunto subscribe my name this 14th day of October A. D., 1919.

ROBERT C. MATHES.